(12) United States Patent
Kwon

(10) Patent No.: US 12,529,863 B2
(45) Date of Patent: Jan. 20, 2026

(54) CAMERA DEVICE

(71) Applicant: LG INNOTEK CO., LTD., Seoul (KR)

(72) Inventor: Duk Keun Kwon, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 387 days.

(21) Appl. No.: 18/043,681

(22) PCT Filed: Sep. 2, 2021

(86) PCT No.: PCT/KR2021/011826
§ 371 (c)(1),
(2) Date: Mar. 1, 2023

(87) PCT Pub. No.: WO2022/050708
PCT Pub. Date: Mar. 10, 2022

(65) Prior Publication Data
US 2024/0103246 A1    Mar. 28, 2024

(30) Foreign Application Priority Data

Sep. 2, 2020  (KR) .................. 10-2020-0111485

(51) Int. Cl.
*G02B 7/02*  (2021.01)
*G02B 9/60*  (2006.01)

(52) U.S. Cl.
CPC .............. *G02B 7/021* (2013.01); *G02B 9/60* (2013.01)

(58) Field of Classification Search
CPC ................................. G02B 7/021; G02B 9/60
USPC .......................................................... 359/819
See application file for complete search history.

(56) References Cited

U.S. PATENT DOCUMENTS

| | | |
|---|---|---|
| 11,156,903 B2 | 10/2021 | Chen et al. |
| 11,815,791 B2 | 11/2023 | Chen et al. |
| 2004/0105173 A1 | 6/2004 | Yamaguchi et al. |
| 2014/0184895 A1 | 7/2014 | Ahn et al. |
| 2016/0161699 A1 | 6/2016 | Kim |

(Continued)

FOREIGN PATENT DOCUMENTS

| | | |
|---|---|---|
| CN | 210742587 U | 6/2020 |
| KR | 10-2011-0057606 A | 6/2011 |

(Continued)

OTHER PUBLICATIONS

Supplementary European Search Report dated Feb. 19, 2024 in European Application No. 21864667.7.

(Continued)

*Primary Examiner* — Sharrief I Broome
(74) *Attorney, Agent, or Firm* — Saliwanchik, Lloyd & Eisenschenk

(57) ABSTRACT

The camera device disclosed to an embodiment includes a plurality of lenses which are arranged sequentially along an optical axis from an object side to an image side, and a lens barrel in which the plurality of lenses is received and which has an incident hole formed on an image surface thereof, wherein the lens barrel includes the plurality of lenses. A head part disposed in a region corresponding to a lens closest to an object side of the lens, and an upper portion of the head part may have a smaller length than that of a lower portion of the head part in a vertical direction of the optical axis.

20 Claims, 6 Drawing Sheets

(56) References Cited

U.S. PATENT DOCUMENTS

| | | | |
|---|---|---|---|
| 2016/0209627 A1 | 7/2016 | Seo et al. | |
| 2017/0176649 A1* | 6/2017 | Chang | G02B 5/003 |
| 2018/0335607 A1* | 11/2018 | Lin | G02B 7/021 |
| 2019/0064488 A1* | 2/2019 | Chang | H04N 23/55 |
| 2020/0096723 A1 | 3/2020 | Furutake | |
| 2020/0267293 A1 | 8/2020 | Noh et al. | |
| 2021/0026225 A1 | 1/2021 | Chen et al. | |
| 2022/0011651 A1* | 1/2022 | Chen | H04N 23/687 |
| 2022/0283405 A1* | 9/2022 | Chen | G02B 3/02 |
| 2024/0027880 A1 | 1/2024 | Chen et al. | |

FOREIGN PATENT DOCUMENTS

| | | |
|---|---|---|
| KR | 10-2011-0140040 A | 12/2011 |
| KR | 10-2014-0089007 A | 7/2014 |
| KR | 10-2016-0067687 A | 6/2016 |
| KR | 10-2016-0089743 A | 7/2016 |
| KR | 10-2020-0101039 A | 8/2020 |

OTHER PUBLICATIONS

International Search Report dated Dec. 30, 2021 in International Application No. PCT/KR2021/011826.

* cited by examiner

Object side ← → Image side

CAMERA DEVICE

CROSS-REFERENCE TO RELATED APPLICATIONS

This application is the U.S. national stage application of International Patent Application No. PCT/KR2021/011826, filed Sep. 2, 2021, which claims the benefit under 35 U.S.C. § 119 of Korean Application No. 10-2020-0111485, filed Sep. 2, 2020, the disclosures of each of which are incorporated herein by reference in their entirety.

TECHNICAL FIELD

An embodiment relates to a camera device that has improved optical performance and may be implemented in a compact size.

BACKGROUND ART

The camera device captures an object and stores it as an image or video, and is installed in various applications. In particular, the camera device is produced in a very small size and is applied to not only portable devices such as smartphones, tablet PCs, and laptops, but also drones and vehicles to provide various functions. For example, the camera device may include an imaging lens for forming an image, and an image sensor for converting the formed image into an electrical signal.

In this case, the camera device may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera device employs an image stabilization (IS) technology to correct or inhibit image stabilization due to an unstable fixing device or a camera movement caused by a user's movement.

The most important element for this camera device to obtain an image is an imaging lens that forms an image side. Recently, interest in high resolution is increasing, and research using five or six lenses is being conducted in order to realize this. For example, research using a plurality of imaging lenses having positive (+) and/or negative (−) refractive power is being conducted to realize high resolution. However, when a plurality of lenses is included, there is a problem in that it is difficult to derive excellent optical properties and aberration properties. Recently, camera device has been applied to various applications. For example, research is being conducted to arrange the camera device inside a display, touch panel, etc., and products to which this is applied are also being released. However, it is difficult to realize a compact camera device in consideration of optical characteristics of the plurality of lenses and reliability of a barrel accommodating the plurality of lenses. Accordingly, an area occupied by the camera device on a display or a touch panel increases, resulting in an increase in an area of an ineffective region that cannot be used by a user by the camera device. Therefore, a new optical system and camera device capable of solving the above problems are required.

DISCLOSURE

Technical Problem

An embodiment of the invention provides an optical system with improved optical properties.

An embodiment of the invention provides a camera device capable of miniaturizing a lens barrel.

Technical Solution

An optical system according to an embodiment of the invention comprises a plurality of lenses which are arranged sequentially from an object side toward an image side along an optical axis, and a lens barrel in which the plurality of lenses are received and which has an incident hole formed at an upper surface thereof, wherein the lens barrel comprises a head part which is disposed on a region corresponding to a lens closest to an object side of the plurality of lenses, and an upper portion of the head part may have a smaller length than that of a lower portion of the head part in a vertical direction to the optical axis.

According to an embodiment of the invention, the head part includes an inner side surface facing the lens closest to the object side and an outer side surface corresponding to the inner side surface, and the inner side surface may have two inclined surfaces having different or equal inclination angles. A distance between the inner side surface and the outer side surface may become closer from the upper portion of the head part toward the lower portion of the head part. A distance between the inner side surface and the outer side surface of the lower portion of the head part may be constant.

According to an embodiment of the invention, the lens closest to the object side includes a connection surface connecting an end of the effective diameter on the object-side surface and an upper surface of a rib part disposed around the effective region of the lens closest to the object side, a virtual first line parallel to the optical axis contacts the first end of the effective diameter and the first inner side surface of the lens barrel, and a first point where the virtual first line and the inner side surface of the lens barrel contact may have a maximum width at an upper portion of the head part of the lens barrel in a direction perpendicular to the optical axis. The connection surface and the inner side surface of the lens barrel may be spaced apart from each other. The connection surface and the inner side surface of the lens barrel may include regions parallel to each other. The virtual second line parallel to the optical axis contacts a second end of the effective diameter and the second inner side surface of the lens barrel, a second point contacts the virtual second line and the inner side surface of the lens barrel, and a virtual third line connecting the first point and the second point may contact the object-side surface of the lens closest to the object side.

According to an embodiment of the invention, the virtual second line parallel to the optical axis contacts the second end of the effective diameter and the second inner side surface of the lens barrel, and a second point contacts the virtual second line and the inner side surface of the lens barrel. A virtual third line connecting the first point and the second point may be spaced apart from the object-side surface of the lens closest to the object side.

According to an embodiment of the invention, a thickness of the connection surface in the optical axis direction may be thicker than the thickness of the rib part. Also, an inclination angle between the inner side surface of the head part and the optical axis may be greater than 0 degrees and less than 30 degrees.

A camera device according to an embodiment of the invention includes a plurality of lenses sequentially disposed along an optical axis from an object side toward an image side, the plurality of lenses includes a first lens disposed closest to the object side and a connection surface connecting an end of an effective diameter of an object-side surface thereof and an upper surface of a rib part disposed around an effective region of the first lens, and an inclination angle between the connection surface and the optical axis may be smaller than 30 degrees.

According to an embodiment of the invention, the inclination angle between the connection surface and the optical axis may be greater than 0 degrees and less than 30 degrees. The plurality of lenses includes the first lens, a second lens, a third lens, a fourth lens, and a fifth lens sequentially arranged from the object side toward the image side along the optical axis, wherein the first and second lenses may satisfy Equation 1:

$$3<TL1/T2 \quad \text{[Equation 1]}$$

(In Equation 1, TL1 means a distance from an apex on the optical axis of the object-side surface of the first lens to an apex on the optical axis of the object-side surface of the second lens. In addition, T2 means a center thickness of the second lens).

The first lens may satisfy Equation 2:

$$0<Sag1/T1<0.3 \quad \text{[Equation 2]}$$

(In Equation 2, Sag1 is a Sag value of the object-side surface of the first lens, and means a distance from the apex on the optical axis of the object-side surface of the first lens to the end of the effective diameter of the object-side surface of the first lens in a direction of the optical axis, and T1 means a center thickness of the first lens).

The first lens may satisfy Equation 3:

$$0.4<TH1/TL1<1 \quad \text{[Equation 3]}$$

(In Equation 3, TH1 means the distance from an apex on the optical axis of the object-side surface of the first lens to the upper surface of the rib part of the first lens in the direction of the optical axis).

Advantageous Effects

A camera device according to an embodiment may have improved optical characteristics. In detail, the optical system of the camera device may correct aberration characteristics and realize high-definition and high-resolution. A camera device according to an embodiment may be provided in a compact size. In detail, in the lens barrel of the camera device, the head part and the extension part may be provided in a stepped shape. Accordingly, when the camera device is inserted into and placed in a separate member such as a display, the size of the head part may be reduced, thereby minimizing an area of the camera device exposed to the surface of the member. In addition, an area of the non-effective region formed to the member by the camera device may be minimized.

A camera device according to an embodiment may have improved reliability. In detail, the first lens disposed in the head part may include a connection surface facing an inner side surface of the heat part, and the connection surface may have an inclination angle of less than about 30 degrees with respect to an optical axis. Accordingly, it is possible to inhibit or minimize a change in the thickness of the lens barrel caused by the first lens in the lens barrel protruding by the head part. Accordingly, the size of the head part of the lens barrel may be minimized and reliability of the lens barrel may be improved.

BEST MODE

Figure 1:
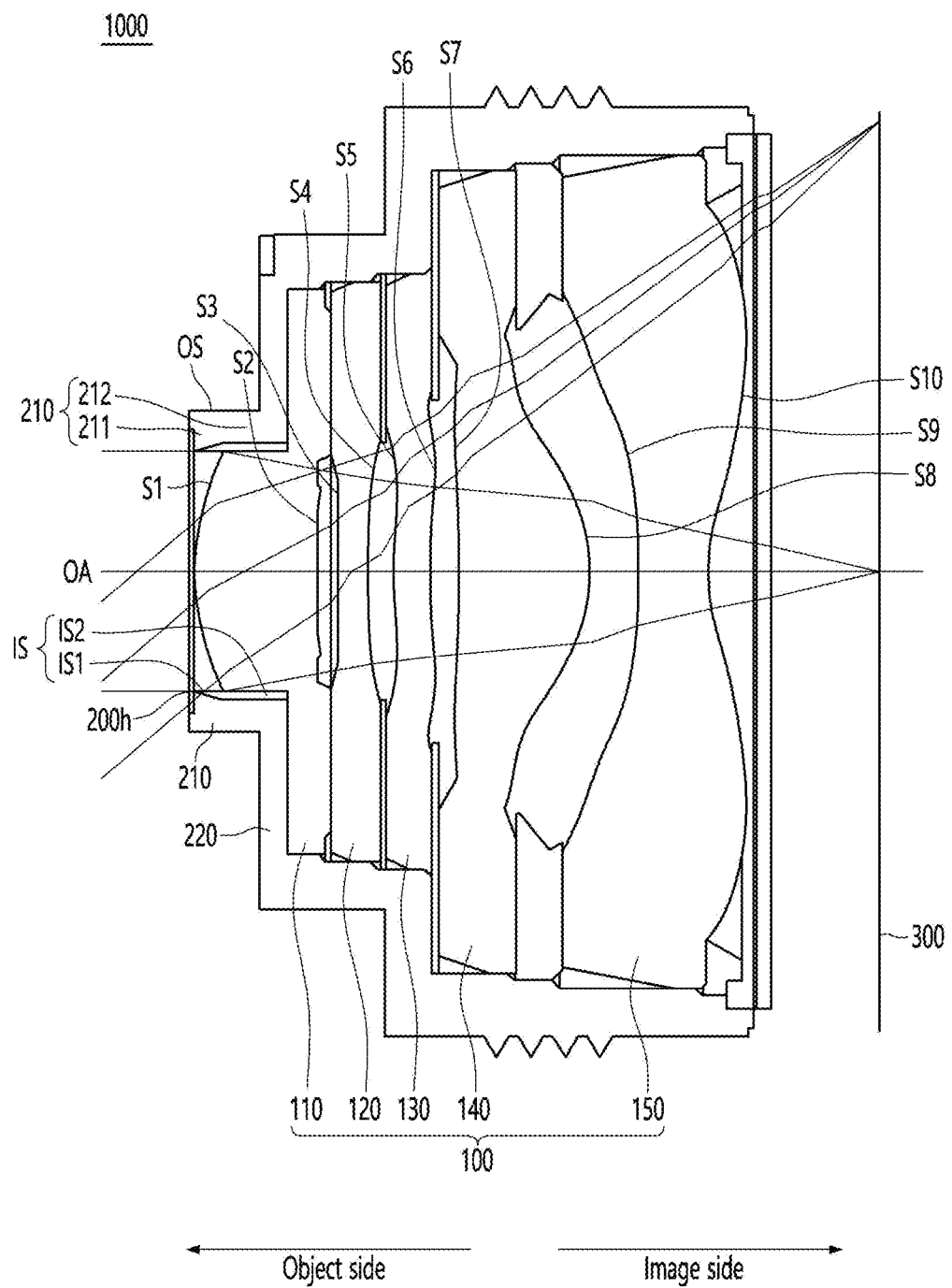
FIGS. 1 and 2 are configuration diagrams of a camera device according to a first embodiment.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

In this specification, a convex surface of the lens may mean that the lens surface of the region corresponding to the optical axis has a convex shape, and a concave surface of the lens may mean that the lens surface of the region corresponding to the optical axis has a concave shape. In addition, the "object-side surface" may refer to a surface of the lens facing the object side with respect to the optical axis, and the "image-side surface" may refer to the surface of the lens facing the imaging surface with respect to the optical axis. The vertical direction may mean a direction perpendicular to the optical axis, and an end of a lens or lens surface may mean an end of an effective region of a lens through which incident light passes.

Figure 2:
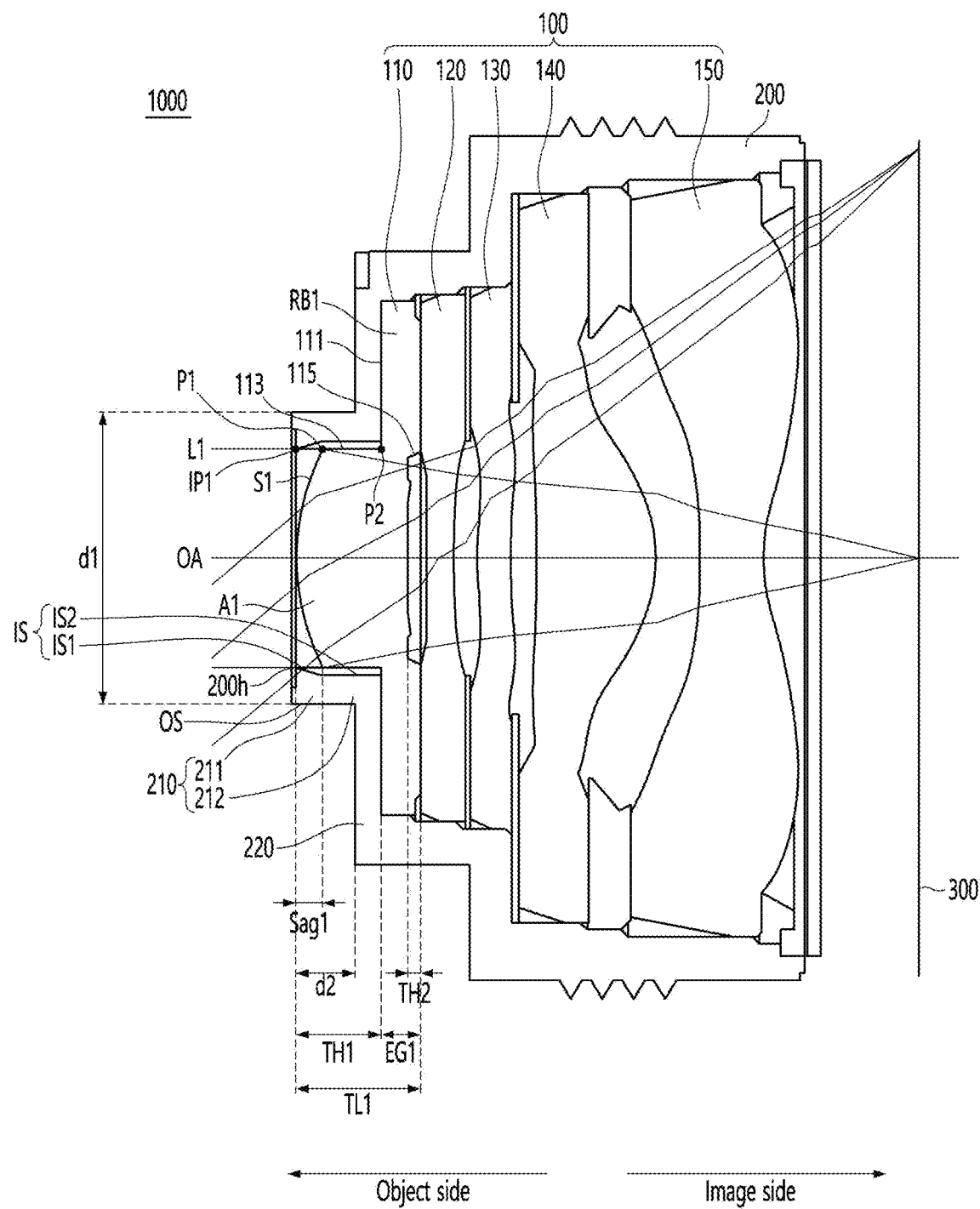
Figure 3:
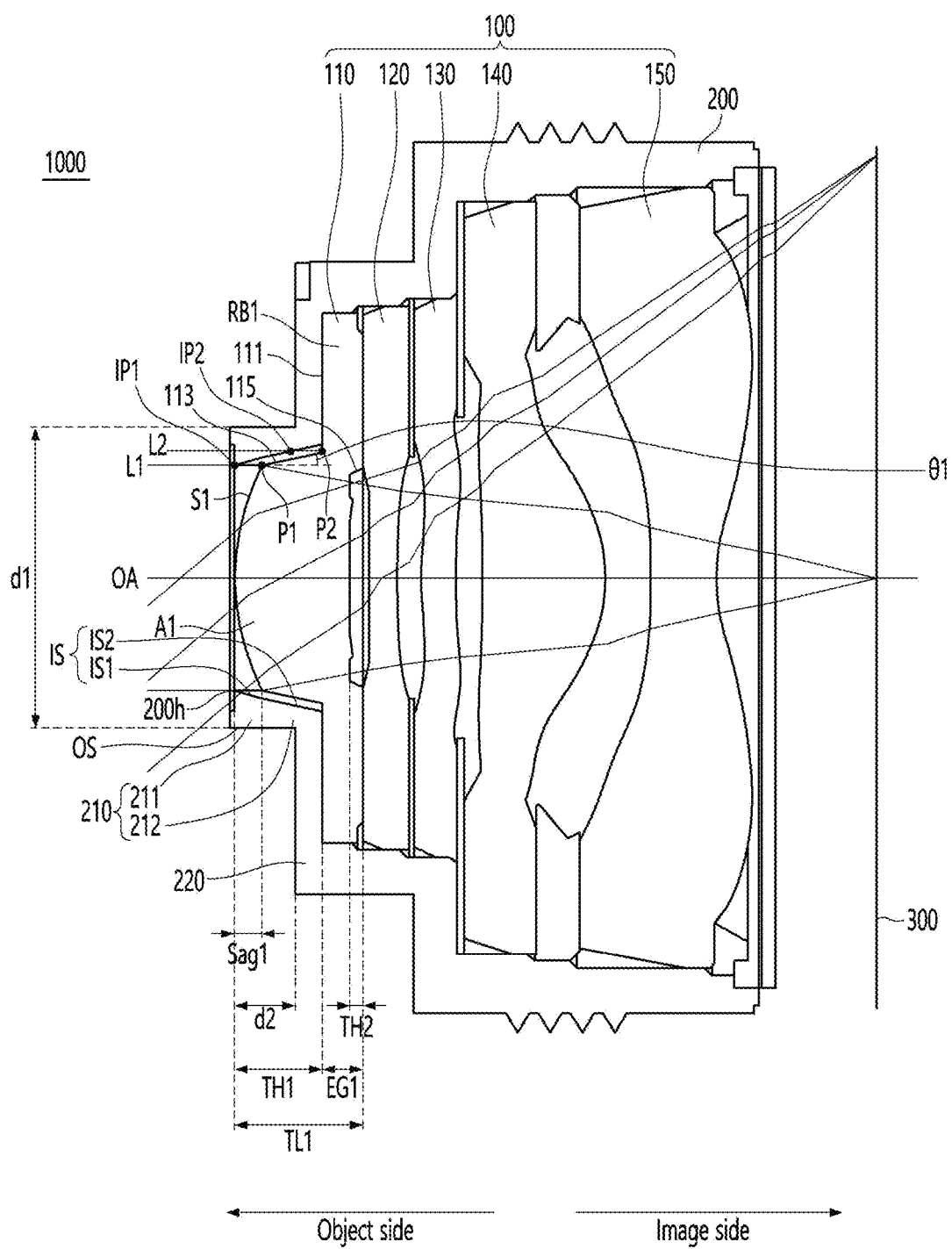
FIG. 3 is a configuration diagram of a camera device according to a second embodiment.
Figure 4:
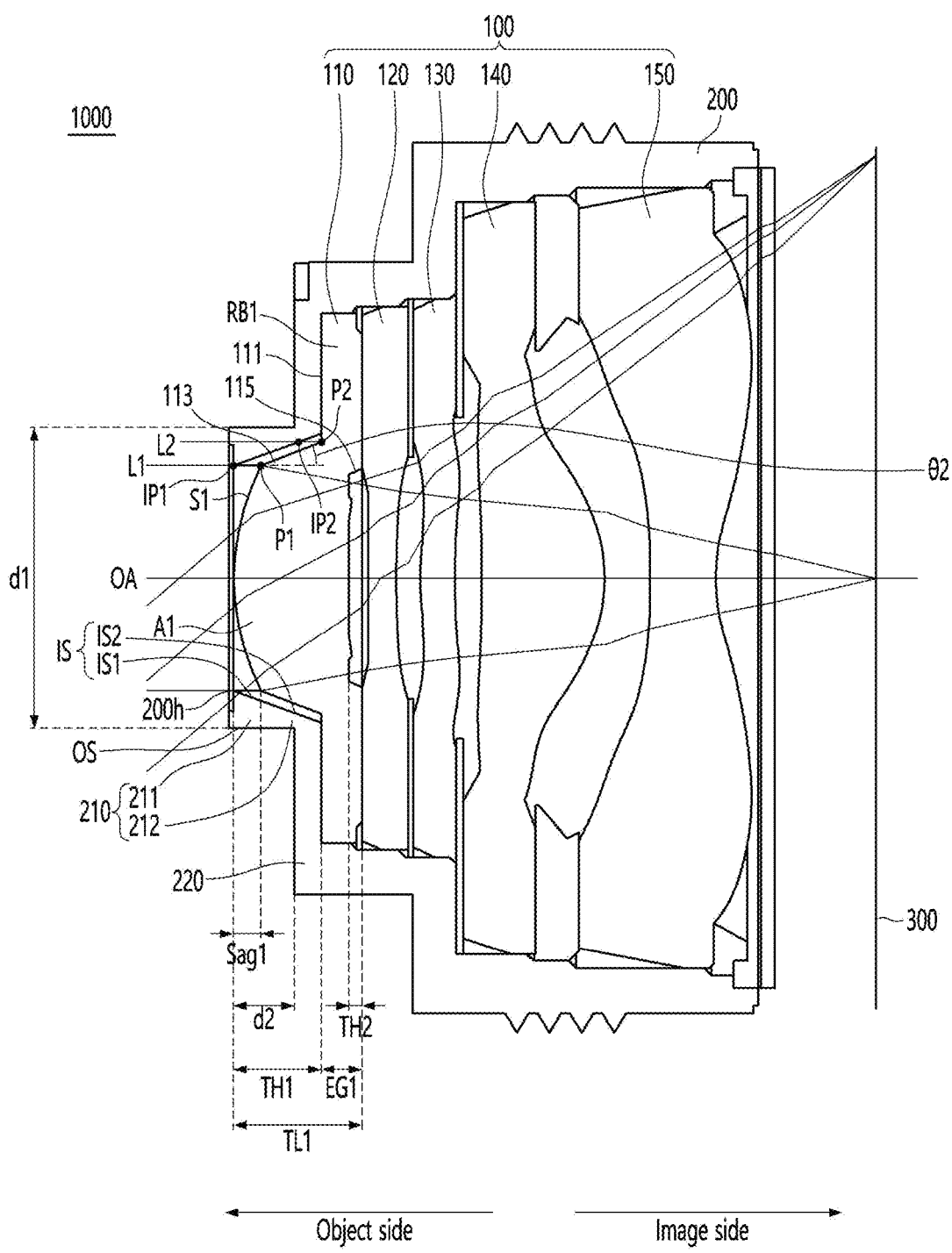
FIG. 4 is a configuration diagram of a camera device according to a third embodiment.

FIGS. 1 and 2 are configuration diagrams of a camera device according to a first embodiment, FIG. 3 is a configuration diagram of a camera device according to a second embodiment, and FIG. 4 is a configuration diagram of a camera device according to a third embodiment.

Referring to FIGS. 1 to 4, a camera device 1000 according to embodiments may include an optical system 100 including a plurality of lenses, a lens barrel 200, and an image sensor 300. The lens barrel 200 may include a receiving space therein. The plurality of lenses may be disposed in the receiving space. The lens barrel 200 may protect the plurality of lenses disposed in the receiving space from the outside and align the plurality of lenses with respect to the optical axis OA. The lens barrel 200 may include an inner side surface facing the plurality of lenses and an outer side surface corresponding to the inner side surface.

The lens barrel 200 may include a head part 210 and an extension part 220. The head part 210 may be located to an upper portion of the lens barrel 200 based on the direction of the optical axis OA. In detail, the head part 210 may be located at the upper portion opposite to a lower portion of the lens barrel 200 adjacent to the image sensor 300. The head part 210 may be disposed in a region corresponding to the first lens 110 closest to the object side among the plurality of lenses. The head part 210 may be disposed in a region corresponding to the effective region A1 of the first lens 110. The head part 210 may extend in the direction of the optical axis OA and protrude toward the object side. The head part 210 may have a set width d1. Here, the width d1 of the head part 210 may mean the width in a direction perpendicular to the optical axis OA. The width d1 of the head part 210 may be smaller than the width of the lower portion of the lens barrel 200. In detail, the width of the upper portion of the head part 210 where the incident hole 200h to be described later is formed may be smaller than the width of the lower portion of the lens barrel 200. The head part 210 may have a set height d2. Here, the height d2 of the head part 210 is the height in the direction of the optical axis OA and may mean a height from the upper surface of the head part 210 to the upper surface of the extension part 220. When the camera device 1000 is inserted into an additional member (not shown) such as a display, the head part 210 may be a region inserted into a hole formed in the substrate. The width d1 and the height d2 of the head part 210 may vary according to the size of a hole formed in a member for insertion of the head part 210. For example, when the camera device 1000 exhibits the same optical performance, the smaller the width d1 of the head part 210, the smaller the region occupied by the lens barrel 200 and the effective region of the member may be secured.

The extension part 220 may be connected to the head part 210. The extension part 220 may be connected to the end of the head part 210. The extension part 220 may be bent and extended from an upper end of the head part 210. The extension part 220 may extend in a direction different from the direction of the optical axis OA. For example, the extension part 220 may extend from the end of the head part 210 in a direction perpendicular to the optical axis OA. The extension part 220 may be disposed in a region corresponding to the rib part RB1 of the first lens 110. Here, the rib part RB1 of the first lens 110 is a region where no light is incident, and may be an ineffective region disposed around an effective region of the first lens 110. The extension part 220 may be disposed facing the object-side surface 1 of the rib part RB1 of the first lens 110. The extension part 220 may directly contact the object-side surface 111 of the rib part RB1. The extension part 220 may have a set width. Here, the width of the extension part 220 may mean a width in a direction perpendicular to the optical axis OA. The width of the extension part 220 may be greater than a width d1 of the head part 210.

The lens barrel 200 may further include an incident hole 200h. The incident hole 200h may be formed on an upper surface of the lens barrel 200. The incident hole 200h may be disposed on the object-side surface of the lens barrel 200. The incident hole 200h is formed through the center of the upper surface of the lens barrel 200 and may communicate with the receiving space of the lens barrel 200. The incident hole 200h may be formed on the upper surface of the head part 210. The incident hole 200h may be formed in a region corresponding to the effective region A1 of the first lens 110. A center of the incident hole 200h may overlap the optical axis OA. A part of the first lens 110 may be disposed inside the head part 210 in which the incident hole 200h is formed. For example, a part of the effective region A1 of the first lens 110 may be inserted and disposed inside the head part 210. The incident hole 200h may provide a path for light incident to the camera device 1000. That is, the light incident to the camera device 1000 may be incident to the plurality of lenses through the incident hole 200h, and the light path is controlled by the plurality of lenses to provide the image sensor 300.

When describing the head part 210 in more detail, the head part 210 may include an upper region 211 and a lower region 212. The upper region 211 may be a region in which the incident hole 200h is formed. The lower region 212 may be a region located at a lower portion adjacent to the image sensor 300 than the upper region 211. The lower region 212 may be a region connecting the upper region 211 and the extension part 220.

The head part 210 may include an inner side surface IS facing the first lens 110 and an outer side surface OS corresponding to the inner side surface IS, and the inner side surface IS may include a first inner side surface IS1 and a second inner side surface IS2. The first inner side surface IS1 may be an inner side surface of the upper region 211 of the head part 210. The first inner side surface IS1 may be connected to the incident hole 200h. The first inner side surface IS1 may extend in the direction of the image sensor 300. Also, the second inner side surface IS2 may be an inner side surface of the lower region 212 of the head part 210. The second inner side surface IS2 may be connected to the first inner side surface IS1. The second inner side surface IS2 is located lower than the first inner side surface IS1 and may extend in the direction of the image sensor 300. The first inner side surface IS1 and the second inner side surface IS2 may have an inclination set with respect to the optical axis OA. For example, an inclination angle of the first inner side surface IS1 with respect to the optical axis OA may be greater than 0 degree and less than 30 degrees. Also, the inclination angle of the second inner side surface IS2 with respect to the optical axis OA may be greater than or equal to 0 degree and less than 30 degrees. In addition, the inclination angles of the first inner side surface IS1 and the second inner side surface IS2 with respect to the optical axis OA may be different from each other. In this case, the inclination angle of the first inner side surface IS1 may be greater than the inclination angle of the second inner side surface IS2. Alternatively, the inclination angles of the first inner side surface IS1 and the second inner side surface IS2 with respect to the optical axis OA may be equal to each other.

The upper region 211 and the lower region 212 of the head part 210 may have lengths in a vertical direction to the set optical axis. In detail, a vertical length to the optical axis OA from the optical axis OA to the inner side surface IS1 of the upper region 211 may increase toward the image sensor 300 from the object side. In addition, the length in the vertical direction to the optical axis OA from the optical axis OA to the inner side surface IS2 of the lower region 212 may increase or be constant from the upper region 211 toward the image sensor. The length in the vertical direction to the optical axis OA from the optical axis OA to the first inner side surface IS1 of the upper region 212 may be smaller than a vertical length to the optical axis OA from the optical axis OA to the second inner side surface IS2 of the lower region 212. In detail, the minimum value of the vertical length to the optical axis OA in the upper region 212 may be smaller than the minimum value of the vertical length to the optical axis OA in the lower region 212. Also, the maximum value of the vertical length to the optical axis OA in the upper region 211 may be smaller than or equal to the maximum value of the vertical length to the optical axis OA in the lower region 212.

Also, the upper region 211 and the lower region 212 of the head part 210 may have set widths. Here, the width is a distance between the inner side surface IS and the outer side surface OS of the head part 210 in a direction perpendicular to the optical axis OA, and may mean the thickness of the head part 210. A width of the head part 210 may decrease from the upper region 211 toward the lower region 212. In detail, the distance between the first inner side surface IS1 and the outer side surface OS in the upper region 211 may become closer toward the image sensor 300 from the object side. Also, the distance between the second inner side surface IS2 and the outer side surface OS in the lower region 212 may be closer or constant toward the image sensor 300 from the object side.

The camera device 1000 may include a virtual first line L1 parallel to the optical axis OA. The first line L1 is in contact with the first end P1 defined as one end of the effective diameter of the object-side surface (first surface S1) of the first lens 110, and may be contacted with the inner side surface of the lens barrel 200. Here, the first end P1 may be a contact point between the first surface S1 of the first lens 110 and a connection surface 113 to be described later. The first line L1 may contact the inner side surface IS of the head part 210. In detail, the first line L1 may contact the first inner side surface IS1 that is the inner side surface of the upper region 211 of the head part 210. Here, the contact point between the first line L1 and the first inner side surface IS1 may be defined as a first point IP1. The upper region 211 of the head part 210 may have a maximum width in a direction perpendicular to the optical axis OA at the first point IP1.

The camera device 1000 may include a virtual second line L2 parallel to the optical axis OA. The second line L2 may be in contact with the second end P2 defined as the other end of the object-side surface (first surface S1) of the first lens 110, and may be in contact with the inner side surface of the lens barrel 200. Here, the second end P2 may be a contact point between the connection surface 113 and the rib part RB1. The second line L2 may contact the inner side surface IS of the head part 210. In detail, the second line L2 may contact the first inner side surface IS1 or the second inner side surface IS2 of the head part 210. Here, the contact point where the second line L2 and the inner side surface IS of the head part 210 are in contact with each other may be defined as a second point IP2. At this time, a third line (not shown), which is a virtual straight line passing through the first point IP1 and the second point IP2 according to the embodiment, is included, and the third line may be in contact with or spaced apart from the lens closest to the object side, for example, the object-side surface (first surface S1) of the first lens 110.

The optical system 100 according to the embodiment may be disposed at a position set by the lens barrel 200. For example, the first lens 110 may be disposed such that a part of the effective region A1 may be inserted into the head part 210 corresponding to the incident hole 200h, and the rib part RB1 may be disposed on an inner side surface of the extension part 220 of the lens barrel 200. Accordingly, the first lens 110 may be aligned with the optical axis OA in the lens barrel 200 and disposed at a fixed position.

In addition, the camera device 1000 according to the embodiment may include the head part 210 and the extension part 220 having a stepped shape, and may include the above-described outer side surface OS, the inner side surface IS, and the extension part 220 and the like. Accordingly, when the camera device 1000 is inserted and disposed in an additional member such as a display, the size of the head part 210 inserted into the member may be reduced. Accordingly, an area exposed to the surface of the member by the camera device 1000 may be minimized, and an area of an ineffective region formed on the member by the camera device 1000 may be effectively reduced.

The optical system 100 may include a plurality of lenses. For example, the optical system 100 may include four or more lenses. In detail, the optical system 100 may include five lenses. The optical system 100 may include the first lens 110, the second lens 120, the third lens 130, the fourth lens 140, and the fifth lens 150. The first to fifth lenses 110, 120, 130, 140, and 150 may be sequentially disposed along the optical axis OA of the optical system 100. The light corresponding to the object information passes through the first lens 110, the second lens 120, the third lens 130, the fourth lens 140, and the fifth lens 150, and may be incident on the image sensor 300. Each of the first to fifth lenses 110, 120, 130, 140, and 150 may include an effective region and an ineffective region. The effective region may be a region through which light incident to each of the first to fifth lenses 110, 120, 130, 140, and 150 passes. That is, the effective region may be a region in which the incident light is refracted to implement optical characteristics. The non-effective region is a rib part disposed around the effective region, and may be a region to which the light is not incident. The non-effective region may be a region unrelated to the optical characteristics. Also, the non-effective region may be a region fixed to the lens barrel 200 or the like.

The image sensor 300 may detect light. In detail, the image sensor 300 may detect light sequentially passing through the first to fifth lenses 110, 120, 130, 140, and 150. The image sensor 300 may include a charge coupled device (CCD) or complementary metal oxide semiconductor (CMOS).

A filter (not shown) may be further disposed between the plurality of lenses 110, 120, 130, 140, and 150 and the image sensor 300. The filter may be disposed between the image sensor 300 and the last lens (fifth lens 150) closest to the image sensor 300 among the plurality of lenses 110, 120, 130, 140, and 150. The filter may include at least one of an infrared filter and an optical filter such as a cover glass. The filter may pass light of a set wavelength band and filter light of a different wavelength band. When the filter includes an infrared filter, radiant heat emitted from external light may be blocked from being transferred to the image sensor 300. In addition, the filter may transmit visible light and reflect infrared light.

The camera device 1000 according to the embodiment may include an aperture stop (not shown) for adjusting the amount of incident light. The aperture stop may be disposed between the object and the first lens 110 or between two lenses selected from among the first to fifth lenses 110, 120, 130, 140, and 150. For example, the aperture stop may be disposed on the object-side surface of the first lens 110. At least one lens of the first to fifth lenses 110, 120, 130, 140, and 150 may serve as an aperture stop. For example, an object-side surface or an image-side surface of one lens selected from among the first to fifth lenses 110, 120, 130, 140, and 150 may serve as an aperture stop for adjusting the amount of light.

Hereinafter, a plurality of lenses included in the optical system 100 according to the embodiment will be described in more detail.

TABLE 1

| Lens | Surface | Radius of curvature | Thickness (mm)/ Distance (mm) | Refractive index | Abbe number | Focal length (mm) |
|---|---|---|---|---|---|---|
| Stop | | Infinity | 0 | | | |
| Lens 1 | S1 | 1.737 | 0.870 | 1.5343 | 55.656 | 4.174 |
| | S2 | 6.408 | 0.140 | | | |
| Lens 2 | S3 | 19.106 | 0.223 | 1.6714 | 19.238 | −9.460 |
| | S4 | 4.777 | 0.180 | | | |
| Lens 3 | S5 | 3.889 | 0.320 | 1.5343 | 55.656 | 38.015 |
| | S6 | 4.668 | 0.181 | | | |
| Lens 4 | S7 | −10.553 | 0.930 | 1.5343 | 55.656 | 1.860 |
| | S8 | −0.939 | 0.238 | | | |
| Lens 5 | S9 | −3.675 | 0.510 | 1.5343 | 55.656 | −1.657 |
| | S10 | 1.228 | 0.300 | | | |
| Filter | S13 | Infinity | 0.110 | 1.5231 | 54.49 | |
| Image sensor | S14 | Infinity | 0.769 | | | |

Table 1 shows the radius of curvature, the thickness or each lens, and the distance between the lenses, refractive index, Abbe number, and focal length of the first to fifth lenses 110, 120, 130, 140, and 150 according to the embodiment. Referring to Table 1, the first lens 110 may have positive (+) refractive power. The first lens 110 may include a plastic or glass material. For example, the first lens 110 may be made of a plastic material. The first lens 110 may include a first surface S1 defined as an object-side surface and a second surface S2 defined as an image-side surface. In this case, the first surface S1 may be convex. The second surface S2 may be concave. That is, the first lens 110 may have a meniscus shape convex toward the object side. At least one of the first surface S1 and the second surface S2 may be an aspheric surface. For example, both the first surface S1 and the second surface S2 may be aspherical. The first lens 110 may include a connection surface 113. The connection surface 113 may be a surface disposed between the first surface S1 and the object-side surface 111 that is the upper surface of the rib part RB1. In detail, the connection surface 113 may be a surface that connects between the first end P1 of the effective diameter of the object-side surface (first surface S1) of the first lens 110 and the upper surface 111 of the rib part RB1. The connection surface 113 may have at least one of a straight line and a curved shape. For example, the connection surface 113 may be provided in a straight-line shape to connect the end of the effective diameter and the upper surface 111 of the rib part RB1. The connection surface 113 may face an inner side surface of the head part 210 formed by the incident hole 200h. The connection surface 113 may have a set thickness. Here, the thickness may mean a thickness in the direction of the optical axis OA. A thickness of the connection surface 113 may be greater than a thickness of the rib part RB1 of the first lens 110. The connection surface 113 may be formed to have a set inclination angle with respect to the optical axis OA. An inclination angle between the connection surface 113 and the optical axis OA may be less than about 30 degrees. Also, in the first lens 110, a boundary between the connection surface 113 and the upper surface 111 of the rib part RB1 may have an angular shape having a set angle. However, the embodiment is not limited thereto, and the boundary may be provided as a curved surface having a predetermined curvature.

The second lens 120 may have negative (−) refractive power. The second lens 120 may include a plastic or glass material. For example, the second lens 120 may be made of a plastic material. The second lens 120 may include a third surface S3 defined as an object-side surface and a fourth surface S4 defined as an image-side surface. The third surface S3 may be convex. The fourth surface S4 may be concave. That is, the second lens 120 may have a meniscus shape convex toward the object side. At least one of the third and fourth surfaces S3 and S4 may be an aspherical surface. For example, both the third surface S3 and the fourth surface S4 may be aspheric surfaces.

The third lens 130 may have positive (+) or negative (−) refractive power. In detail, the third lens 130 may have positive (+) refractive power. The third lens 130 may include a plastic or glass material. For example, the third lens 130 may be made of a plastic material. The third lens 130 may include a fifth surface S5 defined as an object-side surface and a sixth surface S6 defined as an image-side surface. The fifth surface S5 may be convex. The sixth surface S6 may be concave. That is, the third lens 130 may have a meniscus shape convex toward the object side. At least one of the fifth surface S5 and the sixth surface S6 may be an aspherical surface. For example, both the fifth surface S5 and the sixth surface S6 may be aspheric surfaces.

The fourth lens 140 may have positive (+) refractive power. The fourth lens 140 may include a plastic or glass material. For example, the fourth lens 140 may be made of a plastic material. The fourth lens 140 may include a seventh surface S7 defined as an object-side surface and an eighth surface S8 defined as an image-side surface. The seventh surface S7 may be concave. The eighth surface S8 may be convex. That is, the fourth lens 140 may have a meniscus shape convex toward the image side. At least one of the seventh surface S7 and the eighth surface S8 may be an aspherical surface. For example, both the seventh surface S7 and the eighth surface S8 may be aspherical surfaces.

The fifth lens 150 may have negative (−) refractive power. The fifth lens 150 may include a plastic or glass material. For example, the fifth lens 150 may be made of a plastic material. The fifth lens 150 may include a ninth surface S9 defined as an object-side surface and a tenth surface S10 defined as an image-side surface. The ninth surface S9 may be concave. The tenth surface S10 may be concave. That is, the fifth lens 150 may have a concave shape on both sides. At least one of the ninth surface S9 and the tenth surface S10 may be an aspherical surface. For example, both the ninth surface S9 and the tenth surface S10 may be aspheric surfaces.

In the optical system 100 according to the embodiment, the value of the aspheric coefficient of each lens surface is shown in Table 2 below.

TABLE 2

| | S1 | S2 | S3 | S4 | S5 |
|---|---|---|---|---|---|
| K | 0.145620396 | 0 | 0 | 0 | 0 |
| A | −0.01133467 | −0.1179992 | −0.13501809 | −0.12373895 | −0.17920802 |
| B | 0.054343409 | 0.433457783 | −0.05709058 | 0.256068421 | −0.61701149 |
| D | −0.89025866 | −4.3895759 | 0.607326615 | 0.019980264 | 4.325307599 |
| E | 7.714147645 | 20.76668616 | −6.16217177 | −4.15458997 | −13.3809947 |
| F | −36.7999294 | −57.4543464 | 25.63995636 | 18.62749118 | 23.59724485 |
| G | 99.39775715 | 92.83862194 | −52.6254517 | −40.6885044 | −24.5761773 |
| H | −152.268711 | −80.9662938 | 53.9472389 | 49.71184273 | 14.00519552 |
| I | 123.4129637 | 29.48502877 | −22.030157 | −32.6425428 | −3.34186442 |
| J | −41.1214772 | 0 | 0 | 9.02562275 | 0 |

| | S6 | S7 | S8 | S9 | S10 |
|---|---|---|---|---|---|
| K | 0 | 0 | −1.27530967 | 1.314250859 | −0.97994531 |
| A | −0.01046298 | 0.168720148 | 0.436157739 | 0.276795086 | −0.34396818 |
| B | −1.2059514 | −0.77441729 | −0.90789981 | −1.07621764 | 0.195703871 |
| D | 3.868194588 | 1.098466354 | 1.093987107 | 1.568925333 | −0.07698649 |
| E | −7.00000934 | −0.49866785 | −0.83215988 | −1.3406384 | 0.018431071 |
| F | 7.998400254 | −0.34140694 | 0.406346352 | 0.732594541 | −0.00212301 |
| G | −5.7381048 | 0.581096492 | −0.10872016 | −0.26321165 | −9.24E−05 |
| H | 2.359881015 | −0.32880899 | 0.008402728 | 0.061801784 | 6.44E−05 |
| I | −0.41993452 | 0.088489545 | 0.00221863 | −0.00877918 | −7.94E−06 |
| J | 0 | −9.47E−03 | −0.00037875 | 5.75E−04 | 3.44E−07 |

Referring to the following drawings, a plurality of embodiments of the inclination angle of the connection surface 113 of the first lens 110 will be described. Referring to FIGS. 1 and 2, in the first embodiment, the head part 210 may include an upper region 211 including a first inner side surface IS1 and a lower region 212 including a second inner side surface IS2. The first inner side surface IS1 and the second inner side surface IS2 may have an inclination set with respect to the optical axis OA. For example, an inclination angle of the first inner side surface IS1 with respect to the optical axis OA may be greater than 0 degree and less than 30 degrees. Also, an inclination angle of the second inner side surface IS2 with respect to the optical axis OA may be greater than or equal to 0 degree and less than 30 degrees. For example, the inclination angle of the second inner side surface IS2 may be 0 degrees parallel to the optical axis OA. That is, in the first embodiment, the inclination angle of the first inner side surface IS1 may be greater than that of the second inner side surface IS2.

The upper region 211 and the lower region 212 of the head part 210 may have lengths in a vertical direction to the set optical axis OA. In detail, the vertical length to the optical axis OA from the optical axis OA to the inner side surface IS1 of the upper region 211 may increase toward the image sensor 300 from the object side. In addition, the vertical length to the optical axis OA from the optical axis OA to the inner side surface IS2 of the lower region 212 may be constant from the upper region 211 toward the image sensor 300.

In this case, the vertical length to the optical axis OA from the optical axis OA to the first inner side surface IS1 of the upper region 211 may be smaller than the length in the vertical direction to the optical axis OA from the optical axis OA to the second inner side surface IS2 of the lower region 212. In detail, the minimum value of the vertical length of the optical axis OA in the upper region 211 may be smaller than the minimum value of the vertical length of the optical axis OA in the lower region 212. Also, the maximum value of the vertical length of the optical axis OA in the upper region 211 may be the same as the maximum value of the vertical length of the optical axis OA in the lower region 212. The upper region 211 and the lower region 212 of the head part 210 may have set widths. In detail, a distance (width) between the first inner side surface IS1 and the outer side surface OS in the upper region 211 may become closer toward the image sensor 300 from the object side. In addition, the distance (width) between the second inner side surface IS2 and the outer side surface OS in the lower region 212 does not change toward the image sensor 300 from the object side and may be constant. The first lens 110 disposed in the head part 210 may include the connection surface 113 having a set inclination angle. In detail, the connection surface 113 may connect between the first end P1 of the first surface S1 of the first lens 110 and the upper surface 111 of the rib part RB1 and may have a straight-line shape.

In the first embodiment, an inclination angle between the connection surface 113 and the optical axis OA may be less than about 30 degrees. In detail, the inclination angle may be 0 degrees. That is, the connection surface 113 may be disposed parallel to the optical axis OA and may include a region parallel to the inner side surface IS. For example, the connection surface 113 may be disposed parallel to the second inner side surface IS2. Also, the connection surface 113 may be spaced apart from the inner side surface IS of the head part 210. The camera device 1000 may include a first line L1 and a second line L2 parallel to the optical axis OA. The first line L1 may contact the first end P1 of the first lens 110 and the first point IP1 of the inner side surface IS of the head part 210. Also, the second line L2 may contact the second end P2 of the first lens 110 and the second point IP2 of the inner side surface IS of the head part 210.

The connection surface 113 according to the first embodiment may have an inclination angle of 0 degrees with respect to the optical axis OA. Accordingly, the first line L1 and the second line L2 may overlap. That is, the first point IP1 and the second point IP2 may be the same point, and the first end P1 and the second end P2 may be arranged on the same line as the first line L1 or the second line L2. Accordingly, the third line extending through the first point IP1 and the second point IP2 and parallel to the optical axis OA may contact the first surface S1 of the first lens 110. In detail, the third line may be in contact with the first end P1 of the first surface S1.

Accordingly, a region of the lens barrel 200 corresponding to the first lens 110 may have improved reliability. For example, a boundary region between the head part 210 and the extension part 220 in the lens barrel 200 may have relatively weak rigidity due to the protruding head part 210. However, in the first embodiment, as the inclination angle satisfies 0 degrees, the thickness between the outer side surface of the head part 210 and the inner side surface of the head part 210 facing the first lens 110 may not be changed by the first lens 110. Accordingly, in the lens barrel 200, each of a boundary region between the head part 210 and the extension part 220, the head part 210 and the extension part 220 may have a thickness to secure rigidity. As a result, the lens barrel 200 may have improved reliability. In addition, the lens barrel 200 may effectively reduce the size of the head part 210 inserted into the member.

Referring to FIG. 3, in the second embodiment, the head part 210 may have the upper region 211 including a first inner side surface IS1 and the lower region 212 including a second inner side surface IS2. The first inner side surface IS1 and the second inner side surface IS2 may have an inclination set with respect to the optical axis OA. For example, an inclination angle of the first inner side surface IS1 with respect to the optical axis OA may be greater than 0 degree and less than 30 degrees. Also, an inclination angle of the second inner side surface IS2 with respect to the optical axis OA may be greater than 0 degrees and less than 30 degrees. For example, in the second embodiment, the inclination angle of the first inner side surface IS1 may be greater than that of the second inner side surface IS2.

The upper region 211 and the lower region 212 of the head part 210 may have lengths in a vertical direction to the set optical axis OA. In detail, a vertical length to the optical axis OA from the optical axis OA to the inner side surface IS1 of the upper region 211 may increase toward the image sensor 300 from the object side. In addition, the vertical length of the optical axis OA from the optical axis OA to the inner side surface IS2 of the lower region 212 may increase from the upper region 211 toward the image sensor 300. The length in the vertical direction of the optical axis OA from the optical axis OA to the first inner side surface IS1 of the upper region 212 may be smaller than the vertical length to the optical axis OA from the optical axis OA to the second inner side surface IS2 of the lower region 212. In detail, the minimum value of the vertical length of the optical axis OA in the upper region 212 may be smaller than the minimum value of the vertical length of the optical axis OA in the lower region 211. Also, the maximum value of the vertical length of the optical axis OA in the upper region 211 may be smaller than the maximum value of the vertical length of the optical axis OA in the lower region 212.

The upper region 211 and the lower region 212 of the head part 210 may have set widths. In detail, a distance (width) between the first inner side surface IS1 and the outer side surface OS in the upper region 211 may become closer toward the image sensor 300 from the object side. In addition, a distance (width) between the second inner side surface IS2 and the outer side surface OS in the lower region 212 may become closer toward the image sensor 300 from the object side. In this case, the maximum distance between the first inner side surface IS1 and the outer side surface OS may be greater than the maximum distance between the second inner side surface IS2 and the outer side surface OS. The first lens 110 disposed in the head part 210 may include a connection surface 113 having a set inclination angle. In detail, the connection surface 113 may connect the first end P1 of the first surface S1 of the first lens 110 and the upper surface 111 of the rib part RB1 and may have a straight-line shape.

In the second embodiment, an inclination angle θ1 between the connection surface 113 and the optical axis OA may be less than about 30 degrees. In detail, the inclination angle θ1 may be about 10 degrees. The connection surface 113 may be spaced apart from the inner side surface IS of the head part 210. The camera device 1000 may include a first line L1 and a second line L2 parallel to the optical axis OA. The first line L1 may contact the first end P1 of the first lens 110 and the first point IP1 of the inner side surface IS of the head part 210. Also, the second line L2 may contact the second end P2 of the first lens 110 and the second point IP2 of the inner side surface IS of the head part 210. The connection surface 113 according to the second embodiment may have an inclination angle of less than about 30 degrees with respect to the optical axis OA. Accordingly, the second line L2 may be positioned above the first line L1 based on the optical axis OA. As a result, the virtual third line extending through the first point IP1 and the second point IP2 may be separated from the first surface S1 of the first lens 110 and the connection surface 113.

Referring to FIG. 4, in the third embodiment, the head part 210 may include an upper region 211 including a first inner side surface IS1 and a lower region 212 including a second inner side surface IS2. The first inner side surface IS1 and the second inner side surface IS2 may have an inclination set with respect to the optical axis OA. For example, an inclination angle of the first inner side surface IS1 with respect to the optical axis OA may be greater than 0 degree and less than 30 degrees. Also, an inclination angle of the second inner side surface IS2 with respect to the optical axis OA may be greater than 0 degrees and less than 30 degrees. For example, in the third embodiment, the inclination angle of the first inner side surface IS1 may be greater than that of the second inner side surface IS2.

The upper region 211 and the lower region 212 of the head part 210 may have lengths in a vertical direction to the set optical axis OA. In detail, a vertical length to the optical axis OA from the optical axis OA to the inner side surface IS1 of the upper region 211 may increase toward the image sensor 300 from the object side. In addition, a length in the vertical direction of the optical axis OA from the optical axis OA to the inner side surface IS2 of the lower region 212 may increase from the upper region 211 toward the image sensor 300.

In this case, the length in the vertical direction to the optical axis OA from the optical axis OA to the first inner side surface IS1 of the upper region 211 may be smaller than the length in the vertical length to the optical axis OA from the optical axis OA to the second inner side surface IS2 of the lower region 212. In detail, the minimum value of the vertical length to the optical axis OA in the upper region 211 may be smaller than the minimum value of the vertical length to the optical axis OA in the lower region 212. Also, the maximum value of the vertical length to the optical axis OA in the upper region 211 may be smaller than the maximum value of the vertical length to the optical axis OA in the lower region 212. The upper region 211 and the lower region 212 of the head part 210 may have set widths. In detail, a distance (width) between the first inner side surface IS1 and the outer side surface OS in the upper region 211 may become closer to the image sensor 300 from the object side. In addition, a distance (width) between the second inner side surface IS2 and the outer side surface OS in the lower region 212 may become closer toward the image sensor 300 from the object side. In this case, the maximum distance between the first inner side surface IS1 and the outer side surface OS may be greater than the maximum distance between the second inner side surface IS2 and the outer side surface OS. The first lens 110 disposed in the head part 210 may include a connection surface 113 having a set inclination angle. In detail, the connection surface 113 may connect the first end P1 of the first surface S1 of the first lens 110 and the upper surface 111 of the rib part RB1 and may have a straight-line shape.

In the third embodiment, an inclination angle θ1 between the connection surface 113 and the optical axis OA may be less than about 30 degrees. In detail, the inclination angle θ1 may be about 20 degrees. The connection surface 113 may be spaced apart from the inner side surface IS of the head part 210. The camera device 1000 may include a first line L1 and a second line L2 parallel to the optical axis OA. The first line L1 may contact the first end P1 of the first lens 110 and the first point IP1 of the inner side surface IS of the head part 210. Also, the second line L2 may contact the second end P2 of the first lens 110 and the second point IP2 of the inner side surface IS of the head part 210. The connection surface 113 according to the third embodiment may have an inclination angle of less than about 30 degrees with respect to the optical axis OA. Accordingly, the second line L2 may be positioned above the first line L1 based on the optical axis OA. As a result, the virtual third line extending through the first point IP1 and the second point IP2 may be separated from the first surface S1 of the first lens 110 and the connection surface 113.

In the lens barrel 200 according to the second and third embodiments, the boundary region between the head part 210 and the extension part 220 may have relatively weak in rigidity due to the protruding head part 210. However, in the second and third embodiments, the inclination angles θ1 and θ2 may be less than about 30 degrees, about 10 degrees and about 20 degrees, respectively. Accordingly, it is possible to minimize a change in the thickness between the outer and inner side surfaces of the head part 210 by the first lens 110. That is, in the embodiments, each of the boundary region between the head part 210 and the extension part 220 in the lens barrel 200, the head part 210 and the extension part 220 may have a thickness for securing rigidity. Therefore, the lens barrel 200 may have improved reliability. In addition, the lens barrel 200 may effectively reduce the size of the head part 210 inserted into the member.

The camera device 1000 according to the above-described embodiments may satisfy at least one of conditional expressions described below. Accordingly, the camera device 1000 according to the embodiment has an optically improved effect and may be implemented in a small size. Also, the camera device 1000 may have improved reliability.

$$\theta<30 \quad \text{[Equation 1]}$$

In Equation 1, θ means an inclination angle (degree) between the connection surface 113 of the first lens 110 and the optical axis OA.

$$3<TL1/T2 \quad \text{[Equation 2]}$$

In Equation 2, TL1 means a distance (mm) from an apex on the optical axis OA of the object-side surface (first surface S1) of the first lens 110 to the apex on the optical axis OA of the object-side surface (third surface S3) of the second lens 120. Also, T2 means the center thickness (mm) of the second lens 120.

$$0<Sag1/T1<0.3 \quad \text{[Equation 3]}$$

In Equation 3, Sag1 is a Sag value of the object-side surface (first surface S1) of the first lens 110, and means a distance (mm) from the apex on the optical axis OA of the object-side surface of the first lens 110 to the end of the effective diameter of the object-side surface (first surface S1) of the first lens 110 in the direction of the optical axis OA. Also, T1 means the center thickness (mm) of the first lens 110.

$$0.4<TH1/TL1<1 \quad \text{[Equation 4]}$$

In Equation 4, TH1 means a distance (mm) from the apex on the optical axis OA of the object-side surface (first surface S1) of the first lens 110 to the upper surface 111 of the rib part RB1 of the first lens 110 in the direction of the optical axis OA. In addition, TL1 means the distance (mm) from the apex on the optical axis OA of the object-side surface (first surface S1) of the first lens 110 to the apex on the optical axis OA of the object-side surface (third surface S3) of the second lens 120.

$$0.2<d2/TL1<0.7 \quad \text{[Equation 5]}$$

In Equation 5, d2 means a height (mm) of the head part 210 in the direction of the optical axis OA, and TL1 means a distance (mm) from an apex on the optical axis OA of the object-side surface (first surface S1) of the first lens 110 to the apex on the optical axis OA of the object-side surface (third surface S3) of the second lens 120.

$$1.2<F/d1<2 \quad \text{[Equation 6]}$$

In Equation 6, F means the total focal length (mm) of the optical system 100, d1 is a diameter of the head part 210 and means a width (mm) of the head part 210 in the direction perpendicular to the optical axis OA.

$$1<TTL/Img<1.5 \quad \text{[Equation 7]}$$

In Equation 7, total track length (TTL) means a distance (mm) from the apex of the object-side surface (first surface S1) of the first lens 110 to the upper surface of the image sensor 300 in the direction of the optical axis OA, and Img means a distance in a vertical direction from the upper surface of the image sensor 300 which is overlapped with the optical axis OA to a region of a 1.0 field of the image sensor 300. That is, Img means a value of ½ of the diagonal length (mm) of the effective region of the image sensor 300.

$$0.5<F/TTL<1 \quad \text{[Equation 8]}$$

In Equation 8, F means the total focal length (mm) of the optical system 100, and TTL (Total track length) means a distance (mm) from the apex of the object-side surface (first surface S1) of the first lens 110 to the upper surface of the image sensor 300 in the direction of the optical axis OA.

$$0.5<F/f1<2 \quad \text{[Equation 9]}$$

In Equation 9, F means the total focal length (mm) of the optical system 100, and f1 means the focal length (mm) of the first lens 110.

$$0.1<TH2/EG1<0.5 \quad \text{[Equation 10]}$$

In Equation 10, TH2 means a distance (mm) from the apex on the optical axis OA of the image-side surface (second surface S2) of the first lens 110 to the lower surface of the rib part RB1 of the first lens 110 in the direction of the optical axis OA. Here, the lower surface of the rib part RB1 may be opposite to the upper surface 111 of the rib part RB1. Also, EG1 means the thickness (mm) of the rib part RB1 of the first lens 110 in the direction of the optical axis OA.

$$0.1 < EG1/TL1 < 0.5 \quad \text{[Equation 11]}$$

In Equation 11, EG1 means the thickness (mm) of the rib part RB1 of the first lens 110 in the direction of the optical axis OA, and TL1 means a distance (mm) from an apex on the optical axis OA of the object-side surface (first surface S1) of the first lens 110 to the apex on the optical axis OA of the object-side surface (third surface S3) of the second lens 120.

$$4 < TTL/d2 < 10 \quad \text{[Equation 12]}$$

In Equation 12, TTL (Total track length) means a distance (mm) from the apex of the object-side surface (first surface S1) of the first lens 110 to the upper surface of the image sensor 300 in the direction of the optical axis OA, and d2 means the height (mm) of the head part 210 in a direction of the optical axis OA.

$$d1/Img < 0.8 \quad \text{[Equation 13]}$$

In Equation 13, d1 means the width (mm) of the head part 210 in the direction perpendicular to the optical axis, and means a distance in a vertical direction from the upper surface of the image sensor 300 which is overlapped with the optical axis OA to a region of a 1.0 field of the image sensor 300. That is, Img means a value of ½ of the diagonal length (mm) of the effective region of the image sensor 300.

$$1.5 < G1 < 1.6 \quad \text{[Equation 14]}$$

In Equation 14, G1 means the refractive index of the first lens 110 for light in the 587 nm band.

$$40 < V1 < 60 \quad \text{[Equation 15]}$$

In Equation 15, V1 means the Abbe number of the first lens 110.

$$1.6 < G2 < 1.7 \quad \text{[Equation 16]}$$

In Equation 16, G2 means the refractive index of the second lens 120 for light in the 587 nm band.

$$15 < V2 < 30 \quad \text{[Equation 17]}$$

In Equation 17, V2 means the Abbe number of the second lens 120.

$$Z = \frac{cY^2}{1 + \sqrt{1 - (1+K)c^2Y^2}} + AY^4 + BY^6 + CY^8 + DY^{10} + EY^{12} + FY^{14} + \ldots \quad \text{[Equation 18]}$$

In Equation 18, Z is Sag and may mean a distance from an arbitrary position on the aspheric surface to the apex of the aspherical surface in the direction of the optical axis. Y may mean a distance from an arbitrary position on the aspheric surface to the optical axis in a direction perpendicular to the optical axis. Also, c may mean the curvature of the lens, and K may mean the conic constant. The A, B, C, D, E, and F may mean aspheric constants.

The camera device 1000 according to the embodiment may satisfy at least one of Equations 1 to 17. In this case, the camera device 1000 may have improved optical characteristics and reduce the size of the head part 210 of the lens barrel 200. When the camera device 1000 satisfies at least one of Equations 1 to 17, the lens barrel 200 may inhibit or minimize a change in the thickness of one region by the lens accommodated therein, resulting in more improved may have reliability. Accordingly, when the camera device 1000 is inserted into and placed in a member such as a display, the camera device 1000 has improved reliability and the area occupied by the camera device 1000 on the surface of the member may be minimized. there is.

TABLE 3

|  | First embodiment | Second embodiment | Third embodiment |
|---|---|---|---|
| θ | 0 | 10 | 20 |
| F |  | 3.75 |  |
| TTL |  | 4.771 |  |
| Img |  | 3.198 |  |
| TL1 |  | 1.01 |  |
| Sag1 |  | 0.206 |  |
| TH1 |  | 0.664 |  |
| TH2 |  | 0.0877 |  |
| T1 |  | 0.87 |  |
| T2 |  | 0.2233 |  |
| d1 |  | 2.3 |  |
| d2 |  | 0.5 |  |
| EG1 |  | 0.29 |  |
| G1 |  | 1.5343 |  |
| G2 |  | 1.6714 |  |

TABLE 4

|  | Equation | First embodiment | Second embodiment | Third embodiment |
|---|---|---|---|---|
| Equation 1 | θ < 30 | 0 | 10 | 20 |
| Equation 2 | 3 < TL1/T2 |  | 4.523 |  |
| Equation 3 | 0 < Sag1/T1 < 0.3 |  | 0.237 |  |
| Equation 4 | 0.4 < TH1/TL1 < 1 |  | 0.657 |  |
| Equation 5 | 0.2 < d2/TL1 < 0.7 |  | 0.495 |  |
| Equation 6 | 1.2 < F/d1 < 2 |  | 1.63 |  |
| Equation 7 | 1 < TTL/Img < 1.5 |  | 1.492 |  |
| Equation 8 | 0.5 < F/TTL < 1 |  | 0.786 |  |
| Equation 9 | 0.5 < F/f1 < 2 |  | 0.898 |  |
| Equation 10 | 0.1 < TH2/EG1 < 0.5 |  | 0.302 |  |
| Equation 11 | 0.1 < EG1/TL1 < 0.5 |  | 0.287 |  |
| Equation 12 | 4 < TTL/d2 < 10 |  | 9.542 |  |
| Equation 13 | d1/Img < 0.8 |  | 0.719 |  |
| Equation 14 | 1.5 < G1 < 1.6 |  | 1.5343 |  |
| Equation 15 | 40 < V1 < 60 |  | 55.656 |  |
| Equation 16 | 1.6 < G2 < 1.7 |  | 1.6714 |  |
| Equation 17 | 15 < V2 < 30 |  | 19.238 |  |

Figure 5:
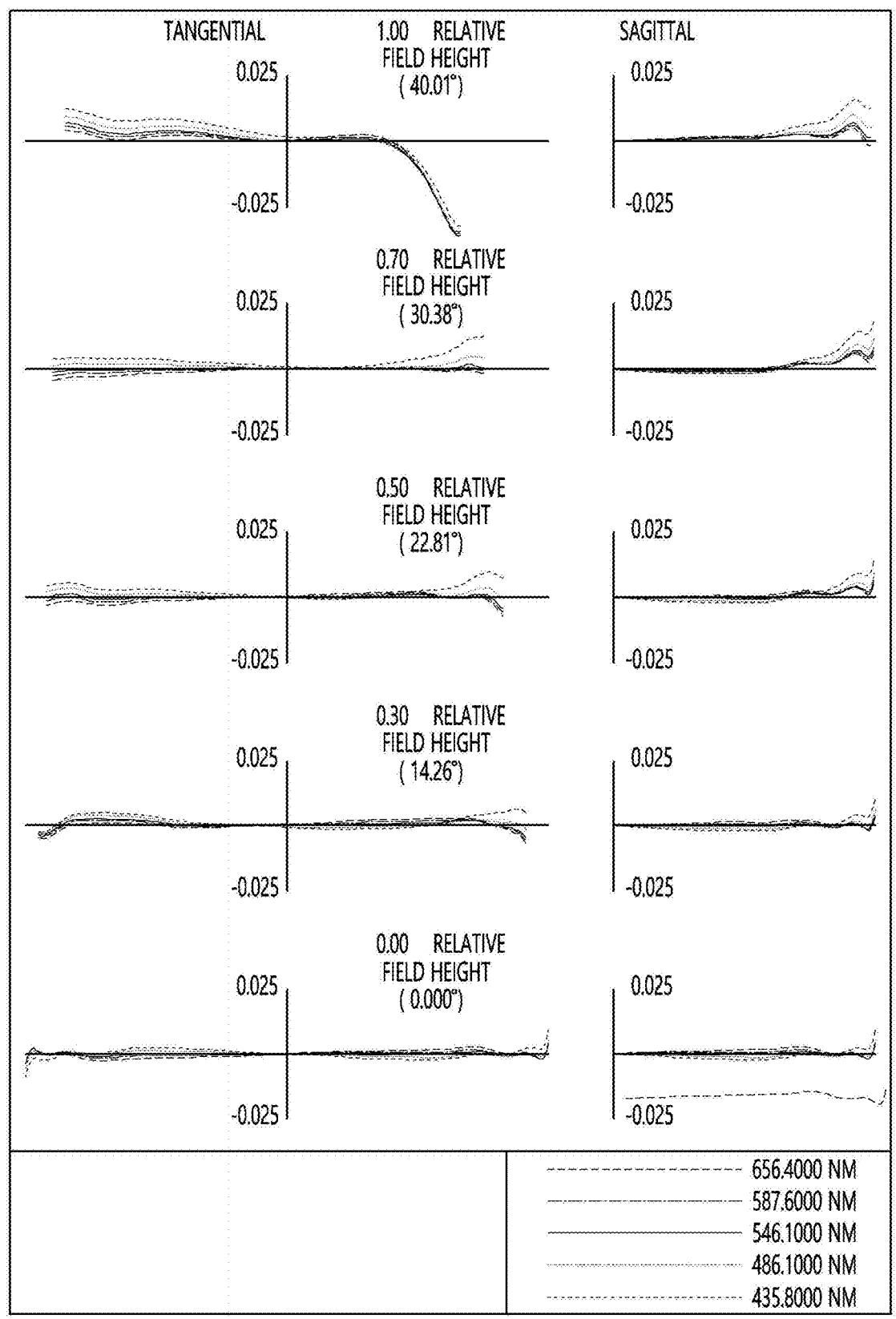
FIG. 5 is a graph illustrating modulation transfer function (MTF) characteristics of a camera device according to an exemplary embodiment.
Figure 6:
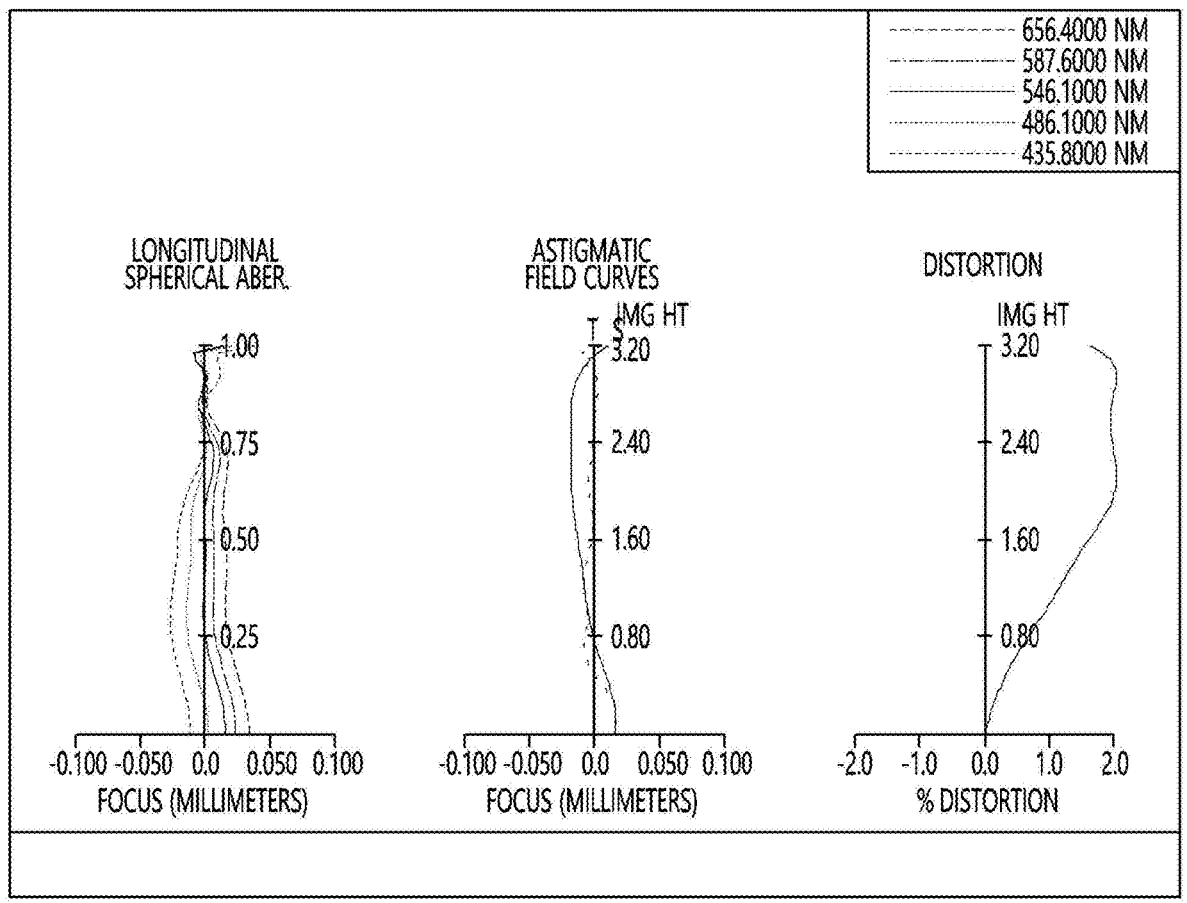
FIG. 6 is a graph illustrating aberration characteristics of a camera device according to an exemplary embodiment.
Figure 7:
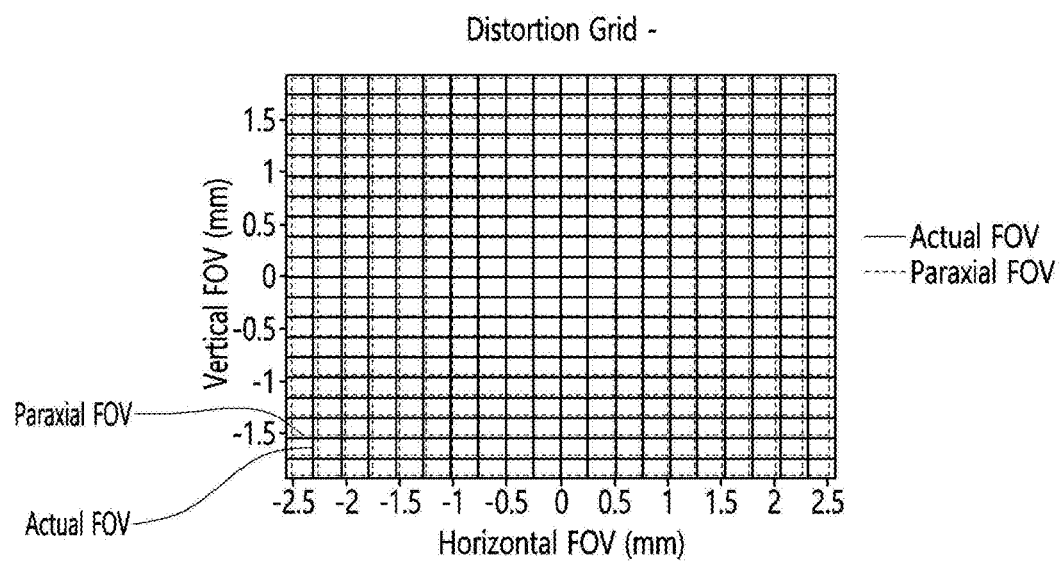
FIG. 7 is a diagram illustrating distortion characteristics of a camera device according to an exemplary embodiment.

Table 3 relates to the items of the equations described above in the camera device 1000 according to the first to third embodiments, and relates the total track length (TTL), the total focal length (F), Img, and the inclination angle between the connection surface 113 and the optical axis OA of the optical system 100. Also, Table 4 shows result values of Equations 1 to 17 in the camera apparatus 1000 according to the first to third embodiments. Referring to Table 4, it may be seen that the camera devices 1000 according to the first to third embodiments satisfy at least one of Equations 1 to 17. In detail, it may be seen that the camera device 1000 according to the embodiment satisfies all of Equations 1 to 17 above. Accordingly, the camera apparatus 1000 according to the first to third embodiments may have Modulation Transfer Function (MTF) characteristics, aberration characteristics, and distortion characteristics as shown in FIGS. 5 to 7. In detail, FIG. 6 is a graph of an aberration diagram of the optical system 100 according to the embodiment, and is a graph measuring longitudinal spherical aberration, astigmatic field curves, and distortion from left to right. In FIG. 6, the X axis may represent a focal length (mm) and distortion (%), and Y axis may represent the height of an image. In addition, a graph of spherical aberration is a graph of light in a wavelength band of about 435 nm, about 486 nm, about 546 nm, about 587 nm, and about 656 nm, and a graph of astigmatism and distortion is a graph of light in a wavelength band of 546 nm. That is, the camera device 1000 according to the first to third embodiments may have improved optical characteristics. In addition, the lens barrel 200 of the camera device 1000 may effectively reduce the size while ensuring the reliability of the heat part 210 inserted into a separate substrate. Accordingly, the camera device 1000 according to the embodiment may be implemented in a small size with improved reliability, and thus may be applied to various substrates.

Features, structures, effects, etc. described in the embodiments above are included in at least one embodiment of the invention, and are not necessarily limited to only one embodiment. Furthermore, the features, structures, and effects illustrated in each embodiment can be combined or modified with respect to other embodiments by those skilled in the art in the field to which the embodiments belong. Therefore, contents related to these combinations and variations should be construed as being included in the scope of the invention. In addition, although the above has been described with a focus on the embodiments, these are only examples and do not limit the invention, and those skilled in the art to which the invention belongs can exemplify the above to the extent that does not deviate from the essential characteristics of the present embodiment. It will be seen that various variations and applications that have not been made are possible. For example, each component specifically shown in the embodiment can be modified and implemented. And differences related to these modifications and applications should be construed as being included in the scope of the invention as defined in the appended claims.

The invention claimed is:

1. A camera device comprising:
  a plurality of lenses that are sequentially arranged from an object side to an image side along an optical axis; and
  a lens barrel in which the plurality of lenses are received and that has an incident hole formed at an upper surface thereof,
  wherein the lens barrel includes a head part that is disposed on a region corresponding to a first lens closest to the object side among the plurality of lenses, and
  wherein the head part includes an object-side portion adjacent to the object side and an image-side portion disposed on an image side of the object-side portion,
  wherein the object-side portion of the head part has a smaller length than that of the image-side portion of the head part in a direction perpendicular to the optical axis,
  wherein the lens barrel includes a receiving space therein,
  wherein the plurality of lenses are disposed in the receiving space of the lens barrel,
  wherein the plurality of lenses include four or more lenses,
  wherein the head part protrudes toward the object side,
  wherein a width of the head part is a width in the direction perpendicular to the optical axis and is smaller than a width of an image-side portion of the lens barrel,
  wherein the lens barrel includes an extension part that is bent from an end of the image-side portion of the head part and extends in the direction perpendicular to the optical axis,
  wherein the head part includes an inner side surface facing the first lens in the direction perpendicular to the optical axis,
  wherein the inner side surface includes a first inner side surface on an object-side region of the head part and a second inner side surface on an image-side region of the head part,
  wherein the first inner side surface and the second inner side surface have different inclination angles with respect to the optical axis,
  wherein the first lens includes a convex object-side surface,
  wherein the first lens has a positive refractive power,
  wherein the head part includes an outer side surface corresponding to the inner side surface,
  wherein a height of the head part in the optical axis direction is d2,
  wherein a distance from an apex of an object-side surface of the first lens to an apex of an object-side surface of a second lens disposed on the image side of the first lens in a direction of the optical axis is TL1, and
  wherein the camera device satisfies following Equation:

$$0.2 < d2/TL1 < 0.7.$$

2. The camera device of claim 1, wherein a distance between the inner side surface and the outer side surface of the head part decreases from the object-side portion of the head part toward the image-side portion of the head part.

3. The camera device of claim 1, wherein a distance between the second inner side surface and the outer side surface of the image-side portion of the head part is constant, and
  wherein a length in the direction perpendicular to the optical axis from the optical axis to the first inner side surface located on the object-side portion of the head part is smaller than a length in the direction perpendicular to the optical axis from the optical axis to the second inner side surface located on the image-side portion of the head part.

4. The camera device of claim 1, wherein the first lens includes a connection surface connecting an end of an effective diameter of an object-side surface and an object-side surface of a rib part disposed around an effective region of the first lens, and
  wherein a virtual first line parallel to the optical axis contacts a first end of the effective diameter of the object-side surface of the first lens and the first inner side surface of the head part, and
  wherein a first point where the virtual first line contacts the first inner side surface of the head part has a maximum width at the object-side portion of the head part of the lens barrel in the vertical direction perpendicular to the optical axis.

5. The camera device of claim 4, wherein the connection surface and the inner side surface of the head part are spaced apart from each other.

6. The camera device of claim 5, wherein the connection surface and the inner side surface of the head part include regions in parallel to each other.

7. The camera device of claim 6, wherein a virtual second line parallel to the optical axis contacts a second end of the effective diameter of the object-side surface of the first lens and the second inner side surface of the head part,
  wherein the camera device comprises a second point in contact with the virtual second line and the second inner side surface of the head part,
  wherein a virtual third line connecting the first point and the second point contacts the object-side surface of the first lens.

8. The camera device of claim 5, wherein a virtual second line parallel to the optical axis contacts a second end of the effective diameter of the object-side surface of the first lens and the second inner side surface of the head part,
wherein the camera device comprises a second point in contact with the virtual second line and the second inner side surface of the head part, and
wherein a virtual third line connecting the first point and the second point is spaced apart from the object-side surface of the first lens.

9. The camera device of claim 8, wherein a thickness of the connection surface in a direction of the optical axis is greater than a thickness of the rib part.

10. The camera device of claim 9, wherein the inclination angle between the first inner side surface of the head part and the optical axis is greater than 0 degrees and less than 30 degrees.

11. A camera device comprising:
a plurality of lenses that are sequentially disposed in a direction from an object side to an image side along an optical axis; and
a lens barrel with the plurality of lenses therein,
wherein the plurality of lenses include a first lens disposed closest to the object side,
wherein the plurality of lenses include four or more lenses,
wherein the first lens includes a connection surface connecting an end of an effective diameter of an object-side surface thereof and an object-side surface of a rib part disposed around an effective region of the first lens, and
wherein an inclination angle between the connection surface and the optical axis is less than 30 degrees,
wherein the lens barrel includes a receiving space therein and a head part disposed around an object-side portion of the first lens,
wherein the plurality of lenses are disposed in the receiving space of the lens barrel,
wherein the head part protrudes toward the object side,
wherein a width of the head part is a width in a direction perpendicular to the optical axis and is smaller than a width of an image-side portion of the lens barrel,
wherein the lens barrel includes an extension part that is bent from an end of an image-side of the head part and extends in the direction perpendicular to the optical axis,
wherein the head part includes an inner side surface facing the first lens in the direction perpendicular to the optical axis,
wherein the inner side surface includes a first inner surface on an object-side region of the head part and a second inner surface on an image-side region of the head part,
wherein the first inner surface and the second inner surface have different inclination angles with respect to the optical axis,
wherein the first lens includes a convex object-side surface,
wherein the first lens has a positive refractive power,
wherein the head part includes an outer side surface corresponding to the inner side surface,
wherein a height of the head part in the optical axis direction is d2,
wherein a distance from an apex of an object-side surface of the first lens to an apex of an object-side surface of a second lens disposed on the image side of the first lens in a direction of the optical axis is TL1, and wherein the camera device satisfies the following Equation:

$$0.2 < d2/TL1 < 0.7.$$

12. The camera device of claim 11, wherein the inclination angle between the connection surface and the optical axis is greater than 0 degrees and less than 30 degrees, and
wherein a thickness of the connecting surface is greater than a thickness of the rib part.

13. The camera device of claim 12, wherein the plurality of lenses includes first to fifth lenses that are sequentially arranged from the object side toward the image side along the optical axis, and
wherein the first and second lenses satisfy the following Equation 1:

$$3 < TL1/T2$$

(In Equation 1, TL1 means a distance from an apex on the optical axis of the object-side surface of the first lens to an apex on the optical axis of an object-side surface of the second lens, and T2 means a center thickness of the second lens).

14. The camera device of claim 13, wherein the first lens satisfies the following Equation 2:

$$0 < Sag1/T1 < 0.3$$

(In Equation 2, Sag1 is a Sag value of the object-side surface of the first lens, and means a distance from the apex on the optical axis of the object-side surface of the first lens to the end of the effective diameter of the object-side surface of the first lens in a direction of the optical axis, and T1 means a center thickness of the first lens).

15. The camera device of claim 12, wherein the first lens satisfies the following Equation 3:

$$0.4 < TH1/TL1 < 1$$

(In Equation 3, TH1 means a distance from an apex on the optical axis of the object-side surface of the first lens to the object-side surface of the rib part of the first lens in a direction of the optical axis).

16. A camera device comprising:
an optical system including first to fifth lenses that are aligned from an object side to an image side along an optical axis; and
a lens barrel to which the first to fifth lenses are coupled,
wherein the first lens is disposed closest to the object side and includes a convex object-side first surface, a concave image-side second surface, and a rib part on an outer circumference,
wherein the first lens includes a connecting surface connecting an end of an effective diameter of the first surface and an object-side surface of the rib part,
wherein an inclination angle between the connecting surface and the optical axis is greater than 0 degrees and less than 30 degrees,
wherein the lens barrel has a head part protruding toward the object-side from the rib part of the first lens,
wherein the head part includes inner side surfaces facing the connecting surface of the first lens in a direction perpendicular to the optical axis,
wherein the inner side surfaces have different inclination angles with respect to the optical axis, and
wherein a height of the head part in a direction of the optical axis is d2,
wherein a distance from an apex of the object-side surface of the first lens to an apex of an object-side surface of the second lens disposed on the image side of the first lens in the direction of the optical axis is TL1, wherein the camera device satisfies the following Equation:

$0.2 < d2/TL1 < 0.7.$

17. The camera device of claim 16, wherein a total focal length of the optical system is F, wherein a diameter of the head part is a width in a direction perpendicular to the optical axis and is indicated as d1, and wherein the camera device satisfies the following Equation:

$1.2 < F/d1 < 2.$

18. The camera device of claim 16, wherein a distance from an apex of the object-side surface of the first lens to the object-side surface of the rib part of the first lens in a direction of the optical axis is TH1, wherein a distance from the apex of the object-side surface of the first lens to an apex of the object-side surface of the second lens in the direction of the optical axis is TL1, and wherein the camera device satisfies the following Equation:

$0.4 < TH1/TL1 < 1.$

19. The camera device of claim 1, wherein the optical system comprises five lenses, and wherein a fifth lens adjacent to an image sensor has a negative refractive power.

20. The camera device of claim 12, wherein the optical system comprises first to fifth lenses, wherein the fifth lens adjacent to an image sensor has a negative refractive power, and wherein the fifth lens has a concave shape on both sides.

* * * * *